United States Patent
Anderson

(10) Patent No.: US 11,778,937 B2
(45) Date of Patent: Oct. 10, 2023

(54) MODULAR AGRICULTURAL TOOLBAR

(71) Applicant: Dennis Anderson, Princeton, IL (US)

(72) Inventor: Dennis Anderson, Princeton, IL (US)

(*) Notice: Subject to any disclaimer, the term of this patent is extended or adjusted under 35 U.S.C. 154(b) by 1001 days.

(21) Appl. No.: 16/387,347

(22) Filed: Apr. 17, 2019

(65) Prior Publication Data

US 2019/0313568 A1     Oct. 17, 2019

Related U.S. Application Data

(60) Provisional application No. 62/658,710, filed on Apr. 17, 2018.

(51) Int. Cl.
| | |
|---|---|
| *A01B 73/06* | (2006.01) |
| *A01B 49/06* | (2006.01) |
| *A01C 7/00* | (2006.01) |
| *A01C 7/06* | (2006.01) |
| *A01C 23/04* | (2006.01) |

(52) U.S. Cl.
CPC ............ *A01B 73/065* (2013.01); *A01B 49/06* (2013.01); *A01C 7/00* (2013.01); *A01C 7/06* (2013.01); *A01C 23/047* (2013.01)

(58) Field of Classification Search
CPC ....... A01B 73/065; A01B 73/06; A01B 73/00; A01B 63/002; A01B 51/00; A01B 49/06; A01C 7/00; A01C 7/06; A01C 23/047
See application file for complete search history.

(56) References Cited

U.S. PATENT DOCUMENTS

| | | | | |
|---|---|---|---|---|
| 1,729,061 A * | 9/1929 | Bucknam | ............... | A01B 73/00 172/418 |
| 3,598,186 A * | 8/1971 | Coontz | .................. | A01B 31/00 37/234 |
| 4,124,080 A * | 11/1978 | McCanse | ............. | E02F 3/7627 172/445.2 |
| 4,319,643 A * | 3/1982 | Carter | .................. | A01B 73/065 172/311 |
| 5,113,956 A * | 5/1992 | Friesen | ................ | A01B 73/065 280/491.2 |
| 5,346,019 A * | 9/1994 | Kinzenbaw | ............ | A01C 7/208 280/412 |
| 5,398,771 A * | 3/1995 | Hornung | ................ | A01C 7/203 172/635 |
| 5,488,996 A * | 2/1996 | Barry | ................... | A01B 73/065 172/311 |
| 5,628,371 A * | 5/1997 | Behrens | ................. | A01B 73/00 172/395 |
| 5,787,988 A * | 8/1998 | Harlan | ................. | A01B 73/065 172/311 |
| 7,854,272 B2 * | 12/2010 | Friggstad | ............. | A01B 73/065 172/311 |

(Continued)

*Primary Examiner* — Jamie L McGowan
(74) *Attorney, Agent, or Firm* — Singleton Law Firm, P.C.

(57) ABSTRACT

A modular agricultural toolbar comprising at least one retractable implement attachment member capable of accommodating various agricultural implementations, as well as a plurality of continuous track units for operational use and a plurality of wheels for transportation and storage use. The implement attachment members further capable of extending along a central axis, increasing the coverage areas of a given agricultural process while also being capable of folding horizontally alongside the core frame of the toolbar to enable ease of transportation and storage.

13 Claims, 13 Drawing Sheets

(56) References Cited

U.S. PATENT DOCUMENTS

| | | | | |
|---|---|---|---|---|
| 7,926,583 B2* | 4/2011 | Newnam | E02F 3/7627 | 172/684.5 |
| 8,342,255 B2* | 1/2013 | Connors | A01B 63/16 | 172/278 |
| 8,428,831 B2* | 4/2013 | Thompson | A01B 69/003 | 172/3 |
| 8,813,864 B2* | 8/2014 | Layton | E02F 9/024 | 172/311 |
| 8,931,573 B1* | 1/2015 | Gramlow | A01B 51/04 | 172/387 |
| 9,096,264 B2* | 8/2015 | Connors | A01C 7/208 | |
| 9,688,322 B1* | 6/2017 | Prickel | B62D 55/084 | |
| 9,699,949 B2* | 7/2017 | Lykken | A01B 73/00 | |
| 10,370,045 B2* | 8/2019 | Prickel | B62D 55/084 | |
| 2005/0087350 A1* | 4/2005 | Bauer | A01B 73/065 | 172/311 |
| 2006/0090910 A1* | 5/2006 | Houck | A01B 73/00 | 172/272 |
| 2006/0288684 A1* | 12/2006 | Van Den Engel | A01D 78/105 | 56/367 |
| 2007/0163791 A1* | 7/2007 | Meek | A01B 73/065 | 172/311 |
| 2011/0100656 A1* | 5/2011 | Connors | A01B 63/16 | 172/278 |
| 2011/0175322 A1* | 7/2011 | McMahon | B60D 1/247 | 280/446.1 |
| 2013/0233580 A1* | 9/2013 | Kinzenbaw | A01B 73/065 | 172/1 |
| 2014/0124225 A1* | 5/2014 | Sauder | A01B 76/00 | 172/430 |
| 2015/0223385 A1* | 8/2015 | Lykken | A01B 73/00 | 172/388 |
| 2015/0223387 A1* | 8/2015 | Lykken | A01B 73/065 | 172/388 |
| 2016/0362149 A1* | 12/2016 | Erlinger | E02F 9/2257 | |
| 2017/0273233 A1* | 9/2017 | Lykken | A01B 73/065 | |
| 2018/0092286 A1* | 4/2018 | Anderson | A01B 63/22 | |
| 2018/0093708 A1* | 4/2018 | Soldan | B62D 11/005 | |
| 2019/0239414 A1* | 8/2019 | DeKam | A01B 63/22 | |

* cited by examiner

MODULAR AGRICULTURAL TOOLBAR

CROSS-REFERENCE TO RELATED APPLICATIONS

This invention claims priority from the previously filed provisional application, U.S. Pat No. 62/658,710, filed Apr. 17, 2018; the contents of which are herein incorporated by reference.

BACKGROUND OF THE INVENTION

The present invention relates to agricultural toolbars. Specifically, a modular agricultural toolbar that can accept various agricultural implements, hydraulically adapt implement elevation in reaction to variable terrain, and hydraulically compact on itself for ease of transportation and storage.

The modern agricultural industry utilizes various processes in cultivating crops over large tracts of land, spanning upwards of a square mile in area. Over the course of the period from planting to harvesting a crop, this area of farmland may undergo a multitude of machine-assisted processes such as sowing, fertilization, pesticide and herbicide treatment, irrigation, and harvesting. In most instances, each process is performed using a specialized implement tailored to that process. Such implements tend to consist of large assemblages anchored to a frame with wheels and an attachment mechanism such that it may be pulled behind a tractor or other means of hauling and operating the implement.

The magnitude and weight of these implements has lead to the need for farmers to own both a multitude of storage space as well as multiple means for hauling and operating them. Farmers may resort to keeping a small number of tractors or hauling means and simply attaching and detaching the implements between them as needed, thereby spending a significant portion of time preparing to cultivate crops rather than actually cultivating.

Prior art agricultural toolbars also utilize a vertical folding system, wherein portions of the toolbar pivot along a plane that is perpendicular to the ground. This folding method increases the vertical clearance allowances needed in both storage and transportation, while also leading to a top-heavy structure that must be transported at a low speed in to avoid a catastrophic overturning of the implement and hauling means.

Additionally, some prior art agricultural toolbars utilize wheel and systems during the course of operation within a field. The weight of the implement in use, combined with the contact surface area between a wheel and the ground, results in the compaction of the soil under the wheel. This compaction can render the soil insufficient for crop cultivation, or at the very least in need of re-working and treatment in order to reinstate it. The overall results after such a device has been used on a given field are clearly defined tracks of unusable soil extending across the length of the field. Further, prior art toolbars that utilize a continuous track propulsion mechanism are severely limited in the speed at which the toolbar can be transported to and from the farm land to be cultivated. Farmers are left with a choice between expediency and soil compaction.

Where a farmer cultivates various different crops, the task of changing and preparing operating implements can be laborious, exhausting precious time to carry out the needed process and leading to increased potential for lost crop. The various implements required for a full-service agricultural operation total a large amount of storage space needed to maintain proper working order and prolonged life of the implements. Such storage needs can lead to higher costs and complications in retrieving each implement from the storage space, leading to additional lost time and profit to the farmer.

Agricultural toolbars typically allow for a small number of implements to be interchangeably connected thereto and utilized by a farmer in a specific process it is designed to perform. However, the agricultural toolbars known in the art are generally proprietary, capable of handling only a small number of implement types and are limited by both the size of the implement used and the size of the toolbar itself. The size of the toolbar can significantly limit the potential field coverage during the chosen cultivation process being performed. This leads to issues similar to those where each implement is a standalone unit. A farmer would still need multiple toolbars of varying sizes and capabilities in order to reliably perform all necessary cultivation processes.

The increasing demands of crop production, cultivation, and yield quotas along with the need for increasingly large implements require farmers to either limit their serviceable farmland, limit their portfolio of cultivated crop, limit their preferred cultivation processes, or some combination thereof. There is a pressing need in the art for an agricultural toolbar with variable or large coverage that can accept most available implements without sacrificing the stability, portability, or the effective storage and field coverage sizes of the toolbar.

The present invention attempts to remedy the limitations of prior art agricultural toolbars by providing a modular agricultural toolbar capable of accommodating a wide array of farming implements while also improving structural integrity, portability, and field coverage efficiency through a horizontal hydraulic folding mechanism, extendable implement attachment members,

PART NOTATION 1. core frame
2. first end of 1
3. second end of 1
4. attachment points on 25, each configured to couple a supply member farming implement
5. end plate/capping bracket holding 7 together at 3
6. pivotal attachment point/pivot bracket disposed on 7
7. rail members
8. attachment point for the supply member
9. central channel
10. sled bracket
11. pivotal support members
12. hydraulic piston
13. stationary bracket
14. vertical axle
15. rotational gear assembly
16. horizontal axle
17. continuous track units
18. anchoring plate of 15
19. hydraulic cylinders of 15
20. bearing of 15
21. implement attachment member
22. hydraulic cylinder on 32
23. planter implement extension member
24. implement attachment points on 21 to attach farming implements
25. abutting member
26. supply member— on top
27. attachment point connecting 21 and 11

28. anchoring body of 17
29. fender member of 17
30. tread member of 17
31. internal wheels of 17
32. wheels on 21

SUMMARY OF THE INVENTION

The present invention is directed at a modular agricultural toolbar capable of accommodating a wide array of farming implementations and reducing soil compaction frequency, while also retaining structural stability and portability. In one embodiment, the invention comprises a core frame 1 having a top and a bottom and a first 2 and second end 3. The core frame 1 further comprises a plurality of rail members 7 configured perpendicularly at the first end to at least one stabilizing member 5, the rail members also having a plurality of pivot brackets 6. At the second end 3, the plurality of rail members 7 is coupled to a capping bracket 5 configured to couple and stably retain the rail members together such that a central channel 9 is formed by a space between the members, the channel spanning a length of the frame. A sled bracket 10 is movably coupled to the plurality of rail members 7 and configured to couple at least one support member 11 and to slide along the rail members 7. The sled bracket 10 is coupled to an end of a hydraulic piston rod 12. A second end of the piston rod is coupled to a stationary bracket 13 spanning the central channel 9, configured to anchor the piston rod 12 thereto. The stationary bracket 13 is further coupled to a ventrally-located vertical axel 14. The vertical axel is coupled to a rotational gear assembly 15, which is further coupled to a horizontal axel 16. The rotational gear assembly 15 is configured to mechanically rotate the coupled horizontal axel 16. The horizontal axel 16 is further coupled to a plurality of continuous track assemblies 17 configured to engage a ground surface and facilitate propulsion of the invention while reducing soil compaction within the engaged surface.

In one embodiment, as shown on FIG. 6, the rotational gear assembly 15 of the modular agricultural toolbar is moveably coupled to an anchoring plate 18. The anchoring plate 18 is coupled to an end of a plurality of hydraulic cylinder pistons 19 which are further coupled at another end to the core frame 1. The plurality of hydraulic cylinder pistons 19 is configured to extend and retract along a vertical axis, raising or lowering the rotational gear assembly 15 as well as the coupled horizontal axle 16 and continuous track units 17.

Further, a plurality of pivotal support members 11 is coupled at a first end to the sled bracket 10 and coupled at a second end to an attachment bracket 34 coupled to an at least one implement member 21. The at least one implement member is further coupled at an end to the pivot bracket 6 of the core frame rail members 7. Coupling of the at least one implement member 21 is configured to allow pivotal movement of the implement member 21 from a position that is directionally parallel to the core frame rail members 7 to a position that is directionally perpendicular to the core frame rail members 7, and back again.

In one embodiment, the at least one implement member 21 of the agricultural toolbar further comprises sections capable of extending and retracting along the axis of the member to increase or decrease the overall length of the implement member 21.

In one embodiment, the agricultural toolbar comprises a plurality of lateral attachment brackets disposed along a ventral face of the implement member 21 and configured to couple various agricultural implements based on a current need of a user.

In another embodiment, the modular agricultural toolbar further comprises a plurality of ventral attachment brackets 4 disposed upon the ventral face of the implement member 21 and configured to couple various agricultural implements 24 as necessary for the user's needs. Additionally, the attachment brackets 4 may also further couple a plurality of transportation wheels, configured to engage a ground surface such as pavement, asphalt, and other materials found in modern road and street surfaces. The transportation wheels are further configured to withstand average to above average rotational speeds while maintaining frictional engagement with a surface and maintaining structural stability of the implement member during transportation of the agricultural toolbar.

In another embodiment, the modular agricultural toolbar has an operational configuration (shown on FIG. 1), wherein the implement member 21 is perpendicular to the rail members 7 of the core frame 1 and is configured to facilitate coverage of a length of farmland for cultivation, as well as spacing along the implement member 21 for any attached cultivation implements for said processes. The modular agricultural toolbar further has a storage configuration (shown on FIG. 2), wherein the implement member 21 is parallel to the rail members 7 of the core frame 1 and is configured to present a narrow and shortened profile to allow for ease of transportation and storage of the agricultural toolbar.

The methods, systems, and apparatuses are set forth in part in the description which follows, and in part will be obvious from the description, or can be learned by practice of the methods, systems, and apparatuses. The advantages of the methods, systems, and apparatuses will be realized and attained by means of the elements and combinations particularly pointed out in the appended claims. It is to be understood that both the foregoing general description and the following detailed description are exemplary and explanatory only and are not restrictive of the methods, systems, and apparatuses, as claimed. More details concerning these embodiments, and others, are further described in the following figures and detailed description set forth herein below.

DETAILED DESCRIPTION OF THE INVENTION

The present invention is described in reference to the accompanying drawings and following embodiments that are presented for the purpose of illustration and should not be construed to limit the scope of the invention thereto.

Figure 1:
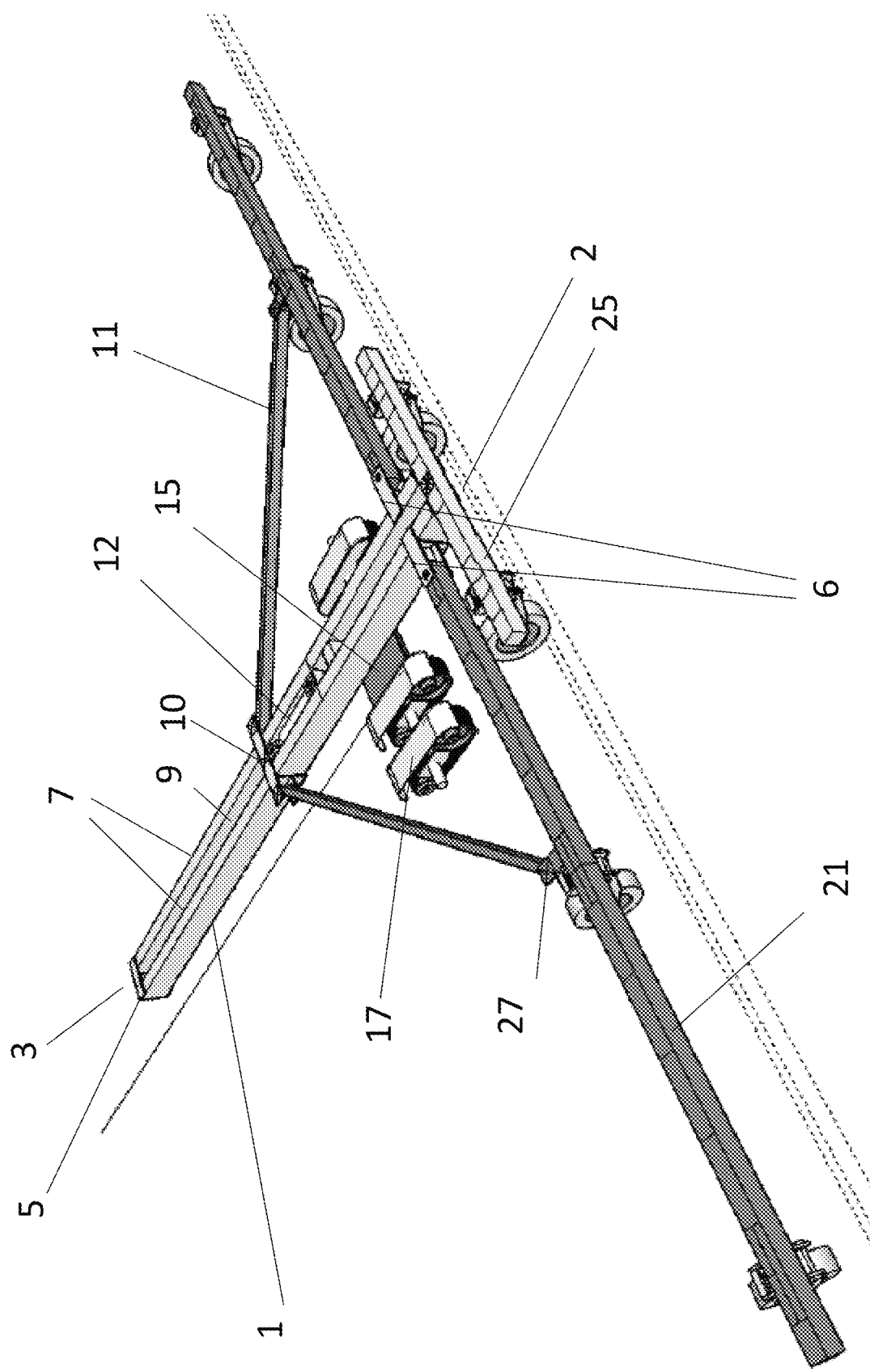
FIG. 1 illustrates a perspective view of the modular agricultural toolbar in an operational configuration.
Figure 2:
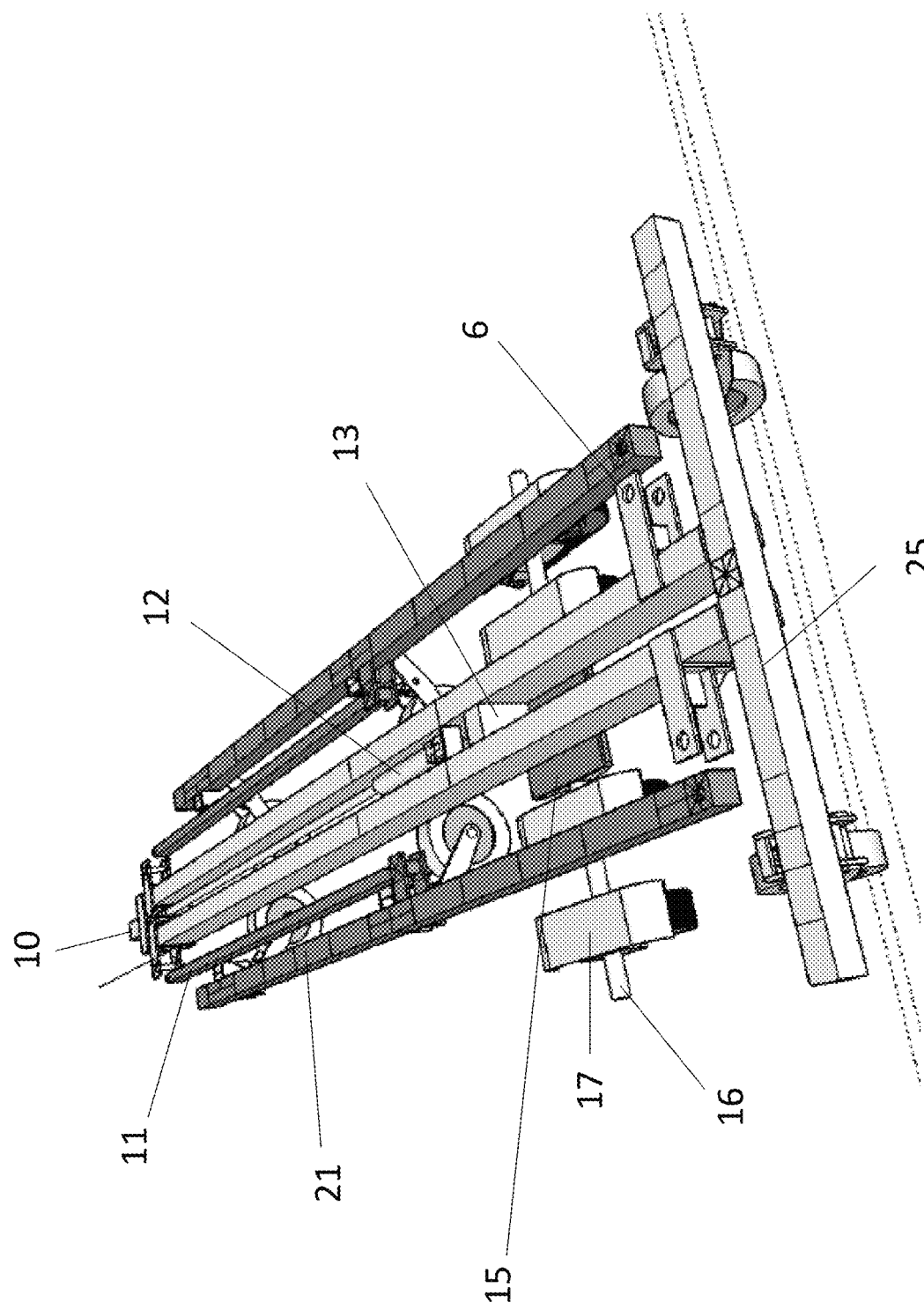
FIG. 2 illustrates a perspective view of the modular agricultural toolbar in a storage configuration.
Figure 3:
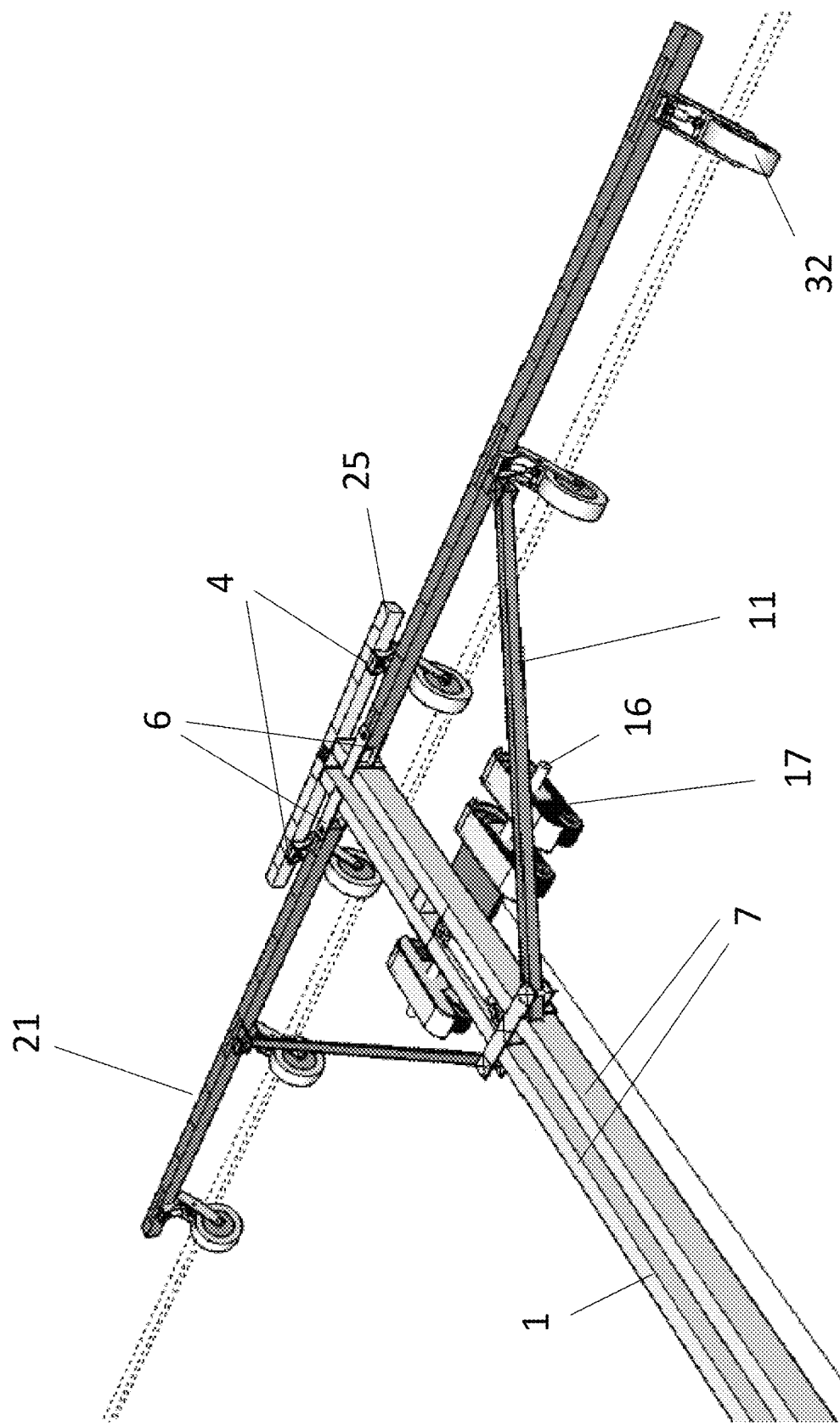
FIG. 3 illustrates a perspective view of the modular agricultural toolbar in an operational configuration and further illustrating the core frame.

FIG. 1 illustrates a perspective view of the modular agricultural toolbar in an operational configuration while FIG. 2 illustrates a perspective view of the modular agricultural toolbar in a storage configuration. The embodiment of FIGS. 1 and 2 comprises a core frame 1, a plurality of pivotal support members 11, and at least one implement attachment member 21. A plurality of rail members 7 coupled at a first end by an end plate 5 and at a second end by an abutting member 25 forms the core frame 1 of the agricultural toolbar. The core frame 1 of the modular agricultural toolbar further comprises a sled bracket 10 movably coupled to the plurality of rail members 7, configured to couple an end of at least one support member 11 and to move along the length of the core frame. In some embodiments, the plurality of rail members 7 of the core frame forms a central channel 9 that spans the length of the core frame. Further, the sled bracket 10 may be partially disposed within the central channel 9 while also coupled to the plurality of rail members. In some embodiments, the core frame 1 may further comprise a stationary bracket 13 disposed within and spanning a length of the central channel 9, configured to provide structural stability to the core frame 1.

In some embodiments of the modular agricultural toolbar, the central channel 9 of the core frame 1 may further comprise a hydraulic piston 12 coupled at a first end to the sled bracket 10 and at a second end to the stationary bracket 13. The hydraulic piston 12 is configured to anchor the sled bracket 10 to the core frame 1 while still allowing it to move along a length of the core frame 1. The piston 12 is also configured to extend and retract along an axis of the central channel 9, transporting the sled bracket 10 in a direction along the core frame's 1 length during a transition between the operational and storage configurations of the agricultural toolbar.

In another embodiment, the end plate 5 of the core frame may further comprise an attachment point configured to couple a hauling means, including but not limited to ball, pintle, receiver, or weight distribution hitches. In another embodiment, the hauling means may be coupled to the core frame 1 of the modular agricultural toolbar through a clamping mechanism that couples the plurality of rail members 7 from any direction sufficient to secure the core frame to the hauling means.

In one embodiment of the agricultural toolbar, the abutting member 25 of the core frame 1 further comprises a plurality of attachment points 4, each configured to couple a supply member farming implement 26, including but not limited to sprayers, seed drills, planters, rotary tills, strip tills, cultivators, reapers, or harvesters. A person of ordinary skill in the art would appreciate that various agricultural implements may be attached to the abutting member 25 once the supply member farming implement 26 is scaled or configured for the correct size attachment required to couple the abutting member 25, if supply member farming implement 26 of suitable size is not readily available.

In another embodiment of the agricultural toolbar, the plurality of rail members of the core frame 7 further comprises at least one pivotal attachment point 6 disposed on the rail member surface at a length from both the abutting member 25 and the central bracket 9, the pivotal attachment point 6 configured to moveably couple an end of at least one implement attachment member 21. The pivotal attachment point 6 is further configured to allow rotational movement of the at least one implement attachment member 21 during a transition between the operational configuration and the storage configuration of the modular agricultural toolbar.

The modular agricultural toolbar further comprises at least one support member 11 coupled at a first end to the sled bracket 10 and coupled at a second end to a pivotal attachment point 27 disposed on a surface of the at least one implement attachment member 21. The at least one support member 11 is further configured to stabilize the implement attachment member 21 during operation and transportation of the agricultural toolbar, while also forming a lever to transfer the force of the central hydraulic piston 12 through the sled bracket 10 and to the implement attachment member 21, thereby facilitating the movement required to extend or contract the implement attachment member 21 towards or away from the core frame 1 during a transition between the operational configuration and the storage configuration.

In one embodiment, the modular agricultural toolbar further comprises at least one implement attachment member 21 coupled at an end to a pivotal attachment point 6 of the core frame 1 and having a plurality of implement attachment points 24 disposed on at least one surface thereof. The implement attachment points 24 are configured to couple and retain at least one agricultural implement to the implement attachment member 21.

In some embodiments, the implement attachment member 21 may further comprise a plurality of wheel members 32 coupled to a surface, configured to facilitate mobility during operation, transportation and storage of the modular agricultural toolbar. A person of ordinary skill in the art would appreciate that an attachment point for the plurality of wheels may be one of the plurality of implement attachment points 24 or may be a dedicated wheel attachment point disposed upon a surface of the implement attachment member 21.

In one embodiment, the implement attachment member 21 of the modular agricultural toolbar may further comprise interconnected, telescoping segments, configured to allow extension or retraction of a length of the implement attachment member 21 member along a central axis of the implement attachment member 21.

In another embodiment, the modular agricultural toolbar may further comprise at least one planter implement extension member 23 coupled to the implement attachment member 21 and configured to further couple agricultural implements requiring further structural support during operation thereof. The planter implement extension member 23 may further comprise a plurality of implement attachment points disposed upon a surface thereof and configured to couple agricultural implements, similar to the plurality of implement attachment points 24 of the implement attachment member 21. The implement attachment points may be further configured to allow offset coupling of implements between the implement attachment member and the planter implement extension member. For example, where a sowing or planting process is performed, should a distance between implement attachment points be too great for the purposes of a user's needs, one or more planter implement extension members with offset attachment points may be coupled in succession to the implement attachment member 21, thereby allowing for coupling of implements at a smaller distance between each, effectively narrowing a distance between a resulting row of crops planted.

Figure 6:
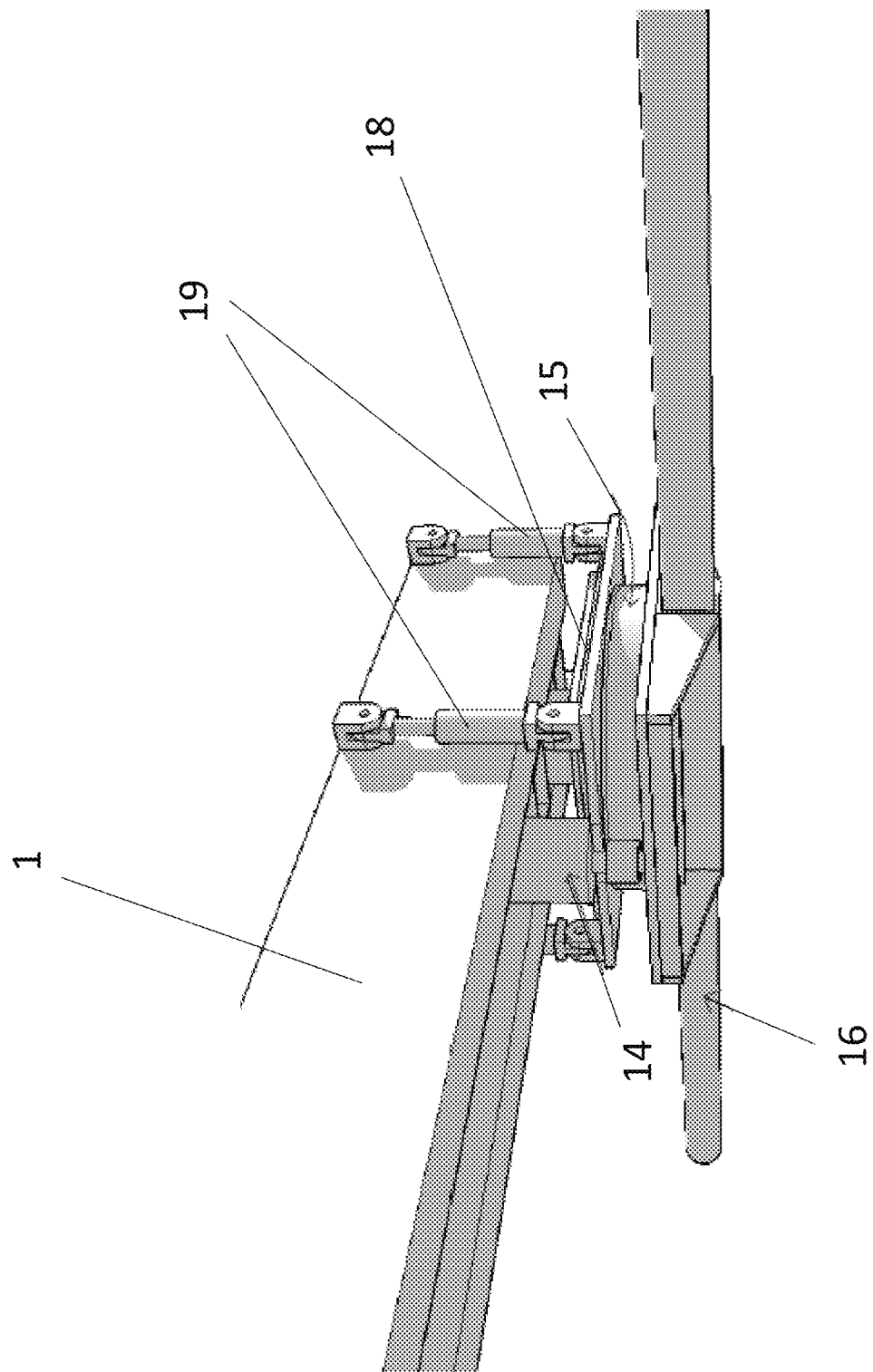
FIG. 6 illustrates a perspective view of the plurality of hydraulic cylinders, the rotational gear assembly, anchoring plate, and horizontal of the modular agricultural toolbar.
Figure 7:
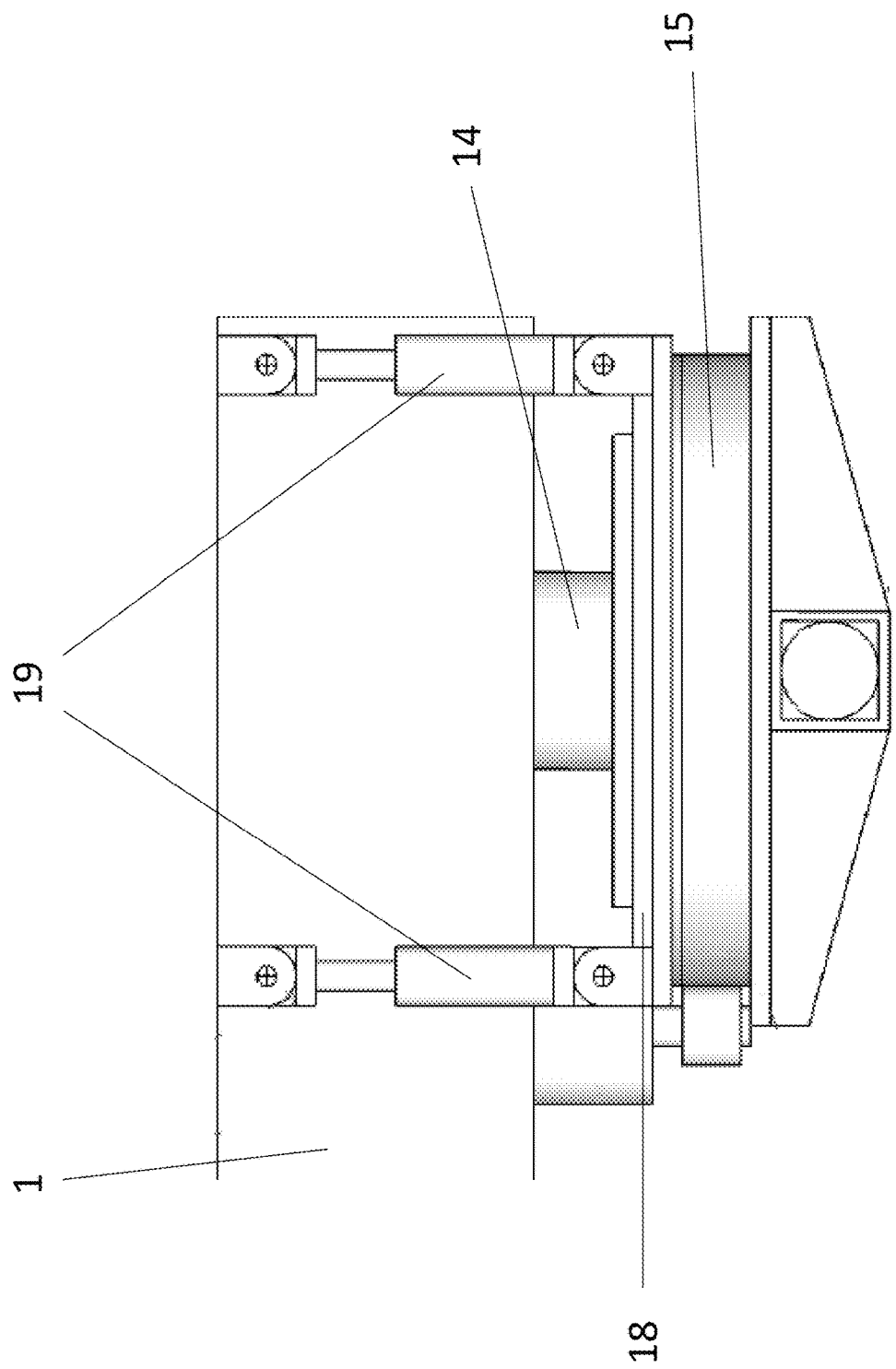
FIG. 7 illustrates a profile view of the plurality of hydraulic cylinders, rotational gear assembly, and anchoring plate of the modular agricultural toolbar.

A shown in FIGS. 6-7, the modular agricultural toolbar further comprises a rotational gear assembly 15 coupled to the stationary bracket 13 of the core frame 1, the assembly configured to rotate along a vertical axis and facilitate operational maneuvers such as turning or angling an implement along a geographical bearing. The rotational gear assembly 15 may further comprise a vertical axle 14 configured to rotationally retain the assembly to the core frame 1 of the agricultural toolbar, allowing for rotational movement during use of the toolbar. The vertical axle 14 of the rotational gear assembly 15 is further coupled through a bearing to a motor, the motor configured to rotate the bearing and vertical axle 14 along a vertical axis, thereby moving the rotational gear assembly 15 during use of the agricultural toolbar.

Figure 4:
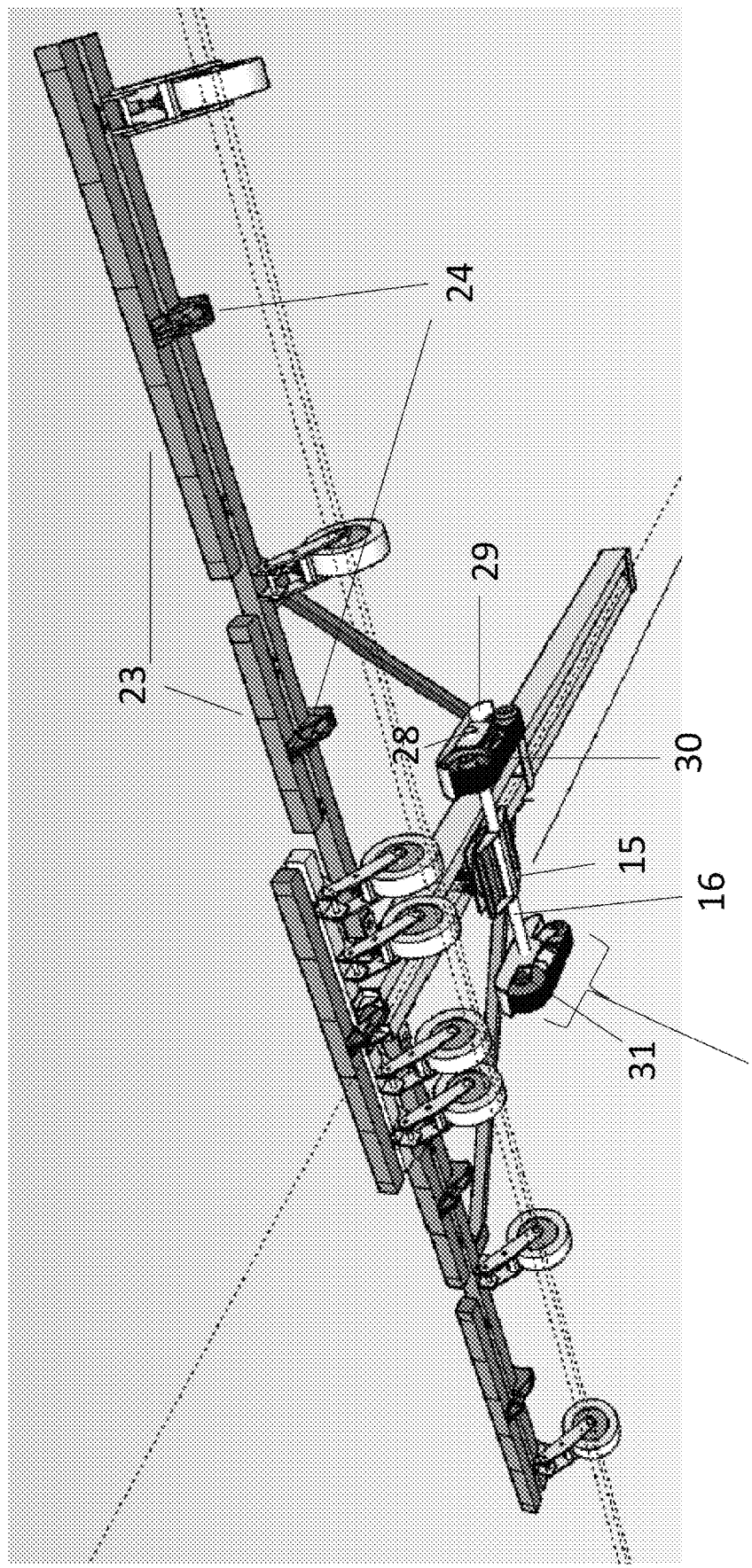
FIG. 4 illustrates a perspective view of the underside of the modular agricultural toolbar in an operational configuration.
Figure 5:
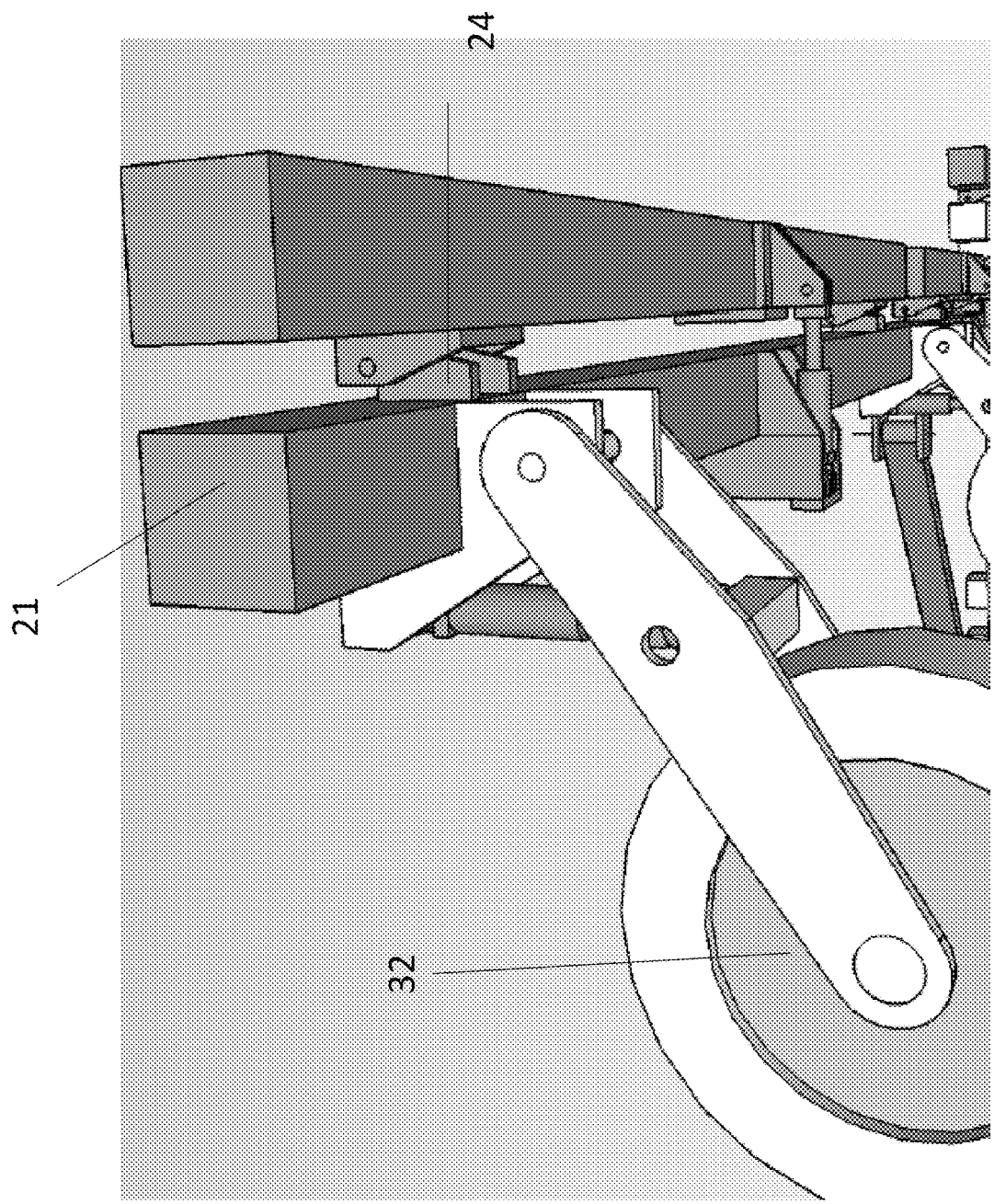
FIG. 5 illustrates a close-up perspective view of the implement member, planter implement extension member, transportation wheel, and the plurality of implement attachment brackets of the modular agricultural toolbar.
Figure 8:
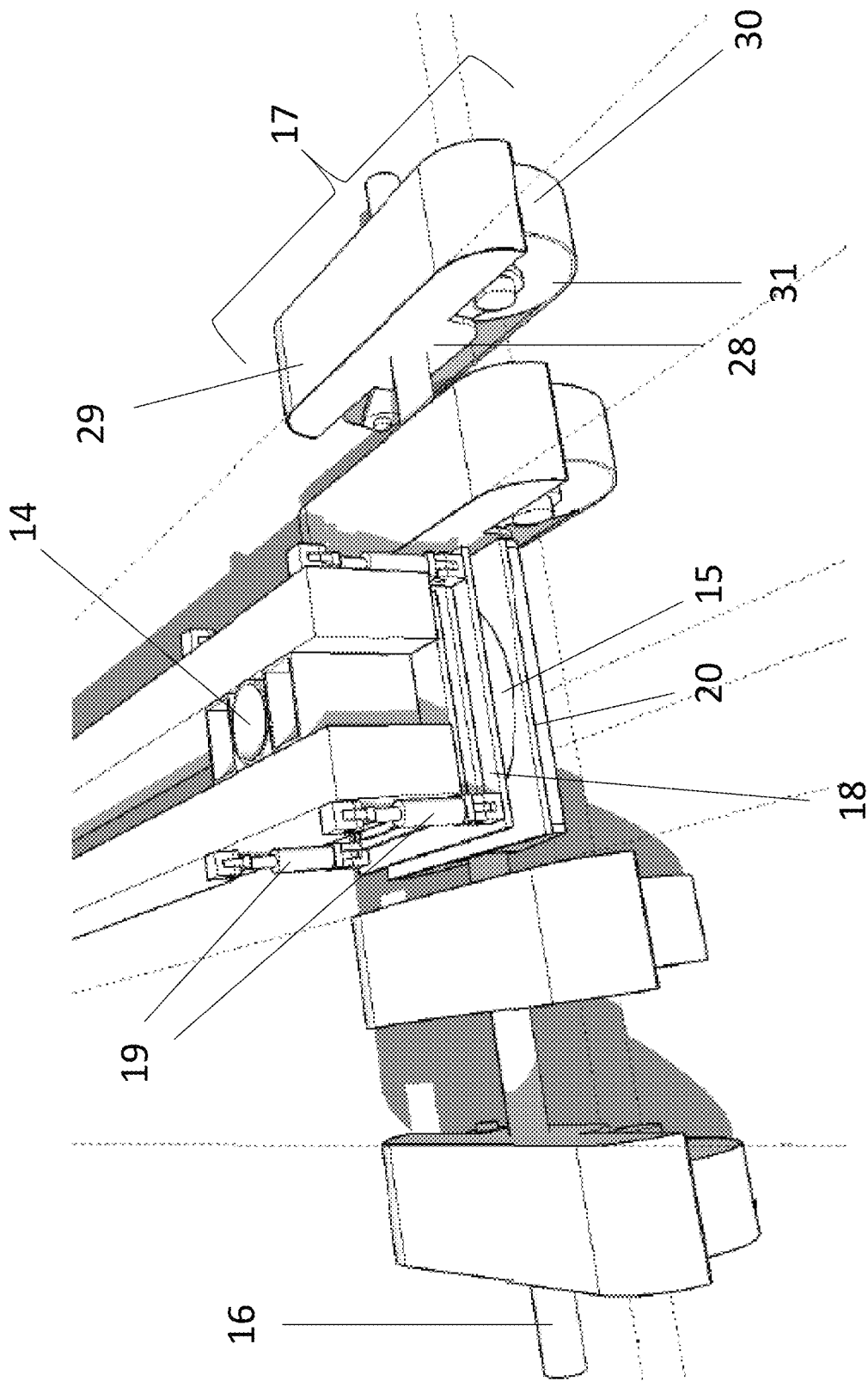
FIG. 8 illustrates a perspective view of the core frame and undercarriage assemblies of the modular agricultural toolbar.
Figure 9:
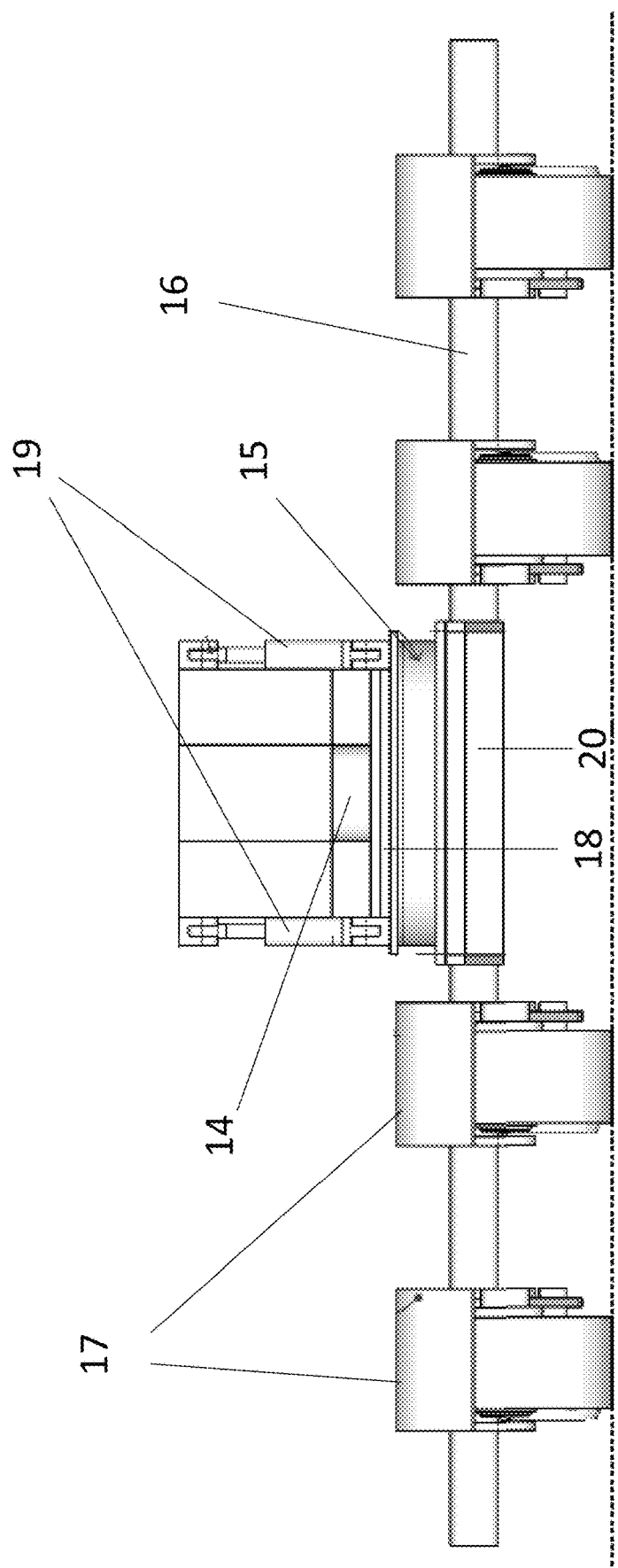
FIG. 9 illustrates a profile view of the core frame and undercarriage assemblies of the modular agricultural toolbar.
Figure 10:
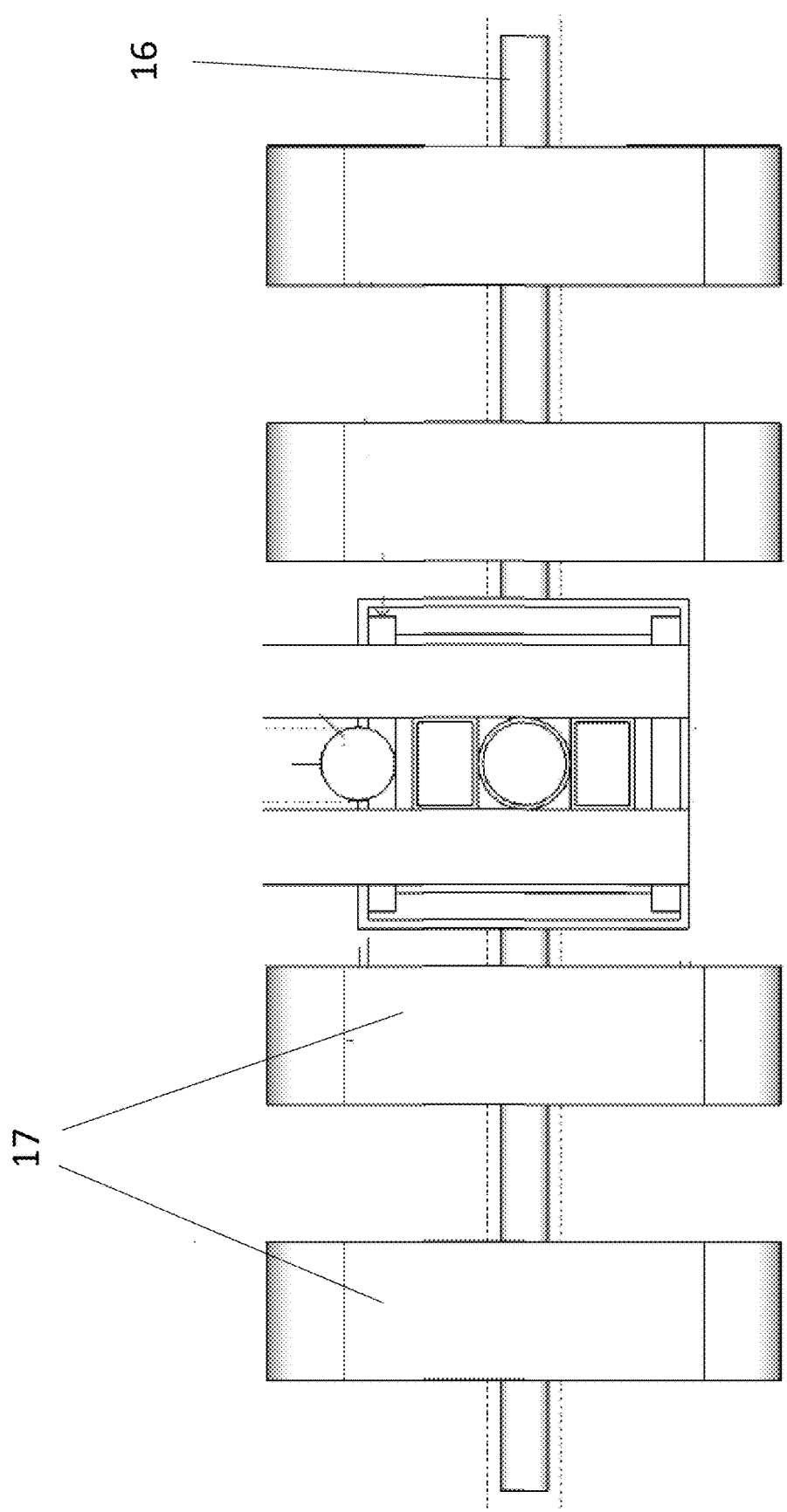
FIG. 10 illustrates a downward profile view of the core frame and undercarriage assemblies of the modular agricultural toolbar.

The rotational gear assembly 15 is further coupled through a horizontal axle 16 to a plurality of continuous track units 17, as shown in FIGS. 8-10. As shown in FIG. 4 and FIG. 8, the plurality of continuous track units 17 is further comprised of an anchoring body 28; a plurality of internal wheels 29 coupled to the anchoring body 28; a fender member 29 coupled to the anchoring body 28, and a tread member 30 coupled to the internal wheels 31. The internal wheels 31 are configured to moveably retain the tread member 30 and allow continuous movement of the tread member 30. The tread member 30 may comprise at least one outward surface configured to frictionally couple a surface during operation of the agricultural toolbar. A person of ordinary skill in the art will understand and appreciate that the tread units may be manufactured from any durable yet pliable material. A person of ordinary skill in the art would further appreciate that any number of continuous track units may be attached to the horizontal axle in order to tailor support and weight distribution needs of the user.

In one embodiment, the rotational gear assembly 15 of the agricultural toolbar further comprises an anchoring plate 18 coupled to and between both the vertical axle 14 and the bearing 20. The anchoring plate 18 may further be moveably coupled to a first end of a plurality of hydraulic cylinders 19. A second end of the plurality of hydraulic cylinders is further coupled to the core frame 1 of the agricultural toolbar. The plurality of hydraulic cylinders 19 are configured to extend and retract in response to either an input force or to the movement of the anchoring plate 18. This configuration allows for the hydraulic cylinders 19 to maintain stability between the rotational gear assembly 15 and the core frame 1 during operation and to absorb or lessen tremor forces generated by operation of the toolbar on uneven, rough, or contoured surfaces while maintaining overall balance of the implement attachment member 21 and any coupled implements through the core frame 1.

In some embodiments of the agricultural toolbar, the stationary bracket 13 of the core frame 1 may comprise a plurality of structural units, each coupled to the core frame and spanning the central channel 9. The plurality of structural units may be configured to further couple the vertical axle 14 or the plurality of hydraulic cylinders 19 of the rotational gear assembly 15.

Figure 11:
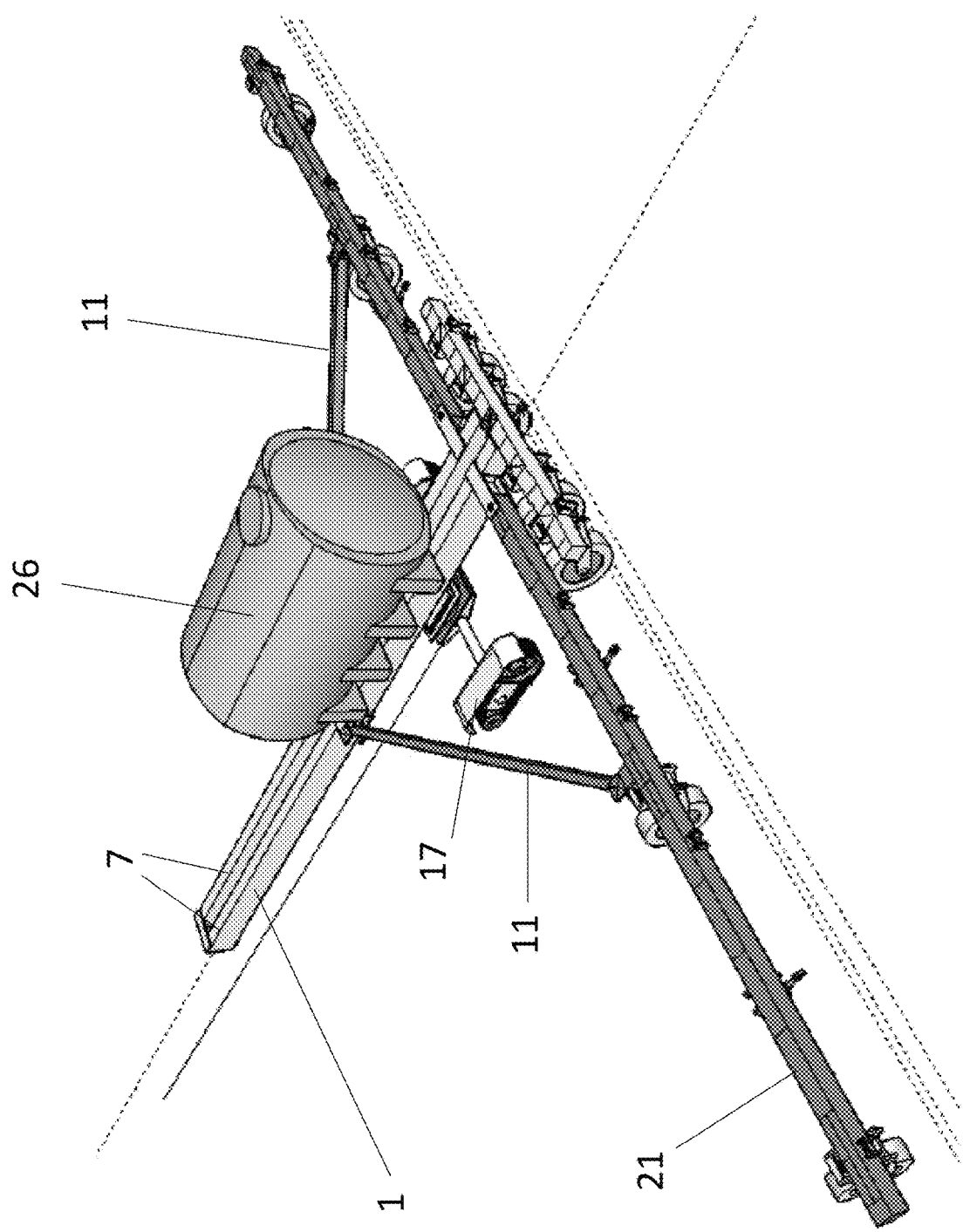
FIG. 11 illustrates a perspective view of the modular agricultural toolbar with a spraying tank implement coupled to the core frame.
Figure 12:
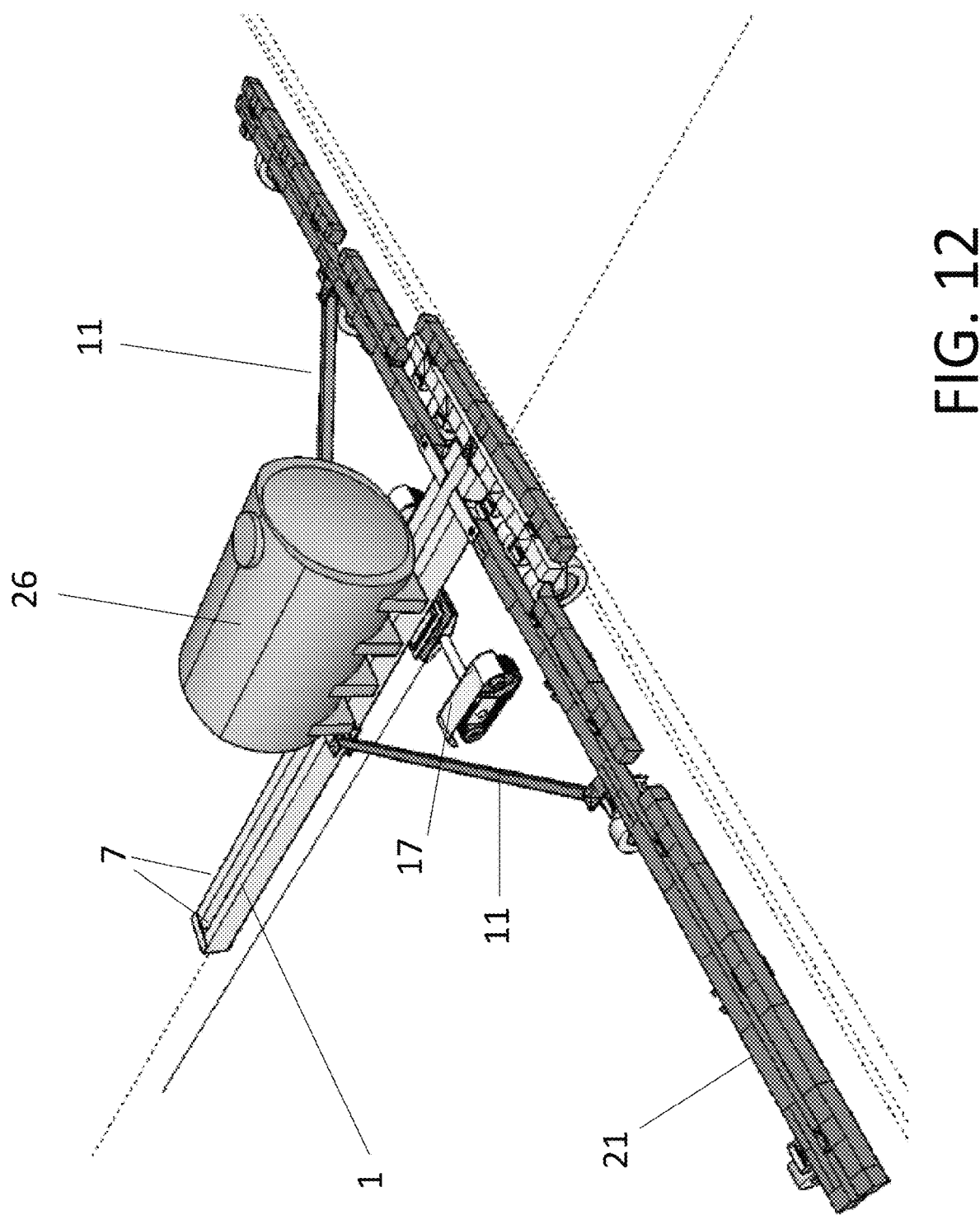
FIG. 12 illustrates a perspective view of the modular toolbar with a spraying tank coupled to the core frame and the planter implement extension member coupled to the implement member.

In another embodiment of the agricultural toolbar, as shown in FIG. 11, a supply member 26 may be coupled to the core frame 1 and configured to supply substances to implements attached to the at least one implement attachment member or attached to the at least one planter implement extension member 23, as shown in FIG. 12. In some embodiments, the stationary bracket 13 of the core frame 1 may extend a length away from the core frame 1, forming an attachment point 8 for the supply member to be coupled to.

A person of ordinary skill in the art will understand and appreciate that the supply member may comprise a tank or hopper structure and may be configured to supply multiple substances needed for a given agricultural process. A supplied substance may comprise, but is not limited to, granular solids, liquids, or gaseous mixtures. A person of ordinary skill in the art will understand and appreciate that a liquid supply may include but is not limited to water, pesticide, herbicide, or other chemical mixture. A person of ordinary skill in the art will further appreciate that the granular solids may include but are not limited to seeds, pellets, grains, or other granular chemical required for an agricultural process. In some embodiments of the invention, a dry fertilizer box may be coupled to the agricultural toolbar and configured to function alongside the tank in strip till tillage processes. In some embodiments, the supply tank structure may have a capacity of three-thousand gallons.

In other embodiments, the plurality of wheels 32 of the implement attachment member 21 may be further configured to support the agricultural toolbar during transportation on paved, graveled, or other roadway surfaces. Further, the plurality of wheels 32 may also comprise a hydraulic cylinder 22 coupled thereto and configured to absorb shock forces from transportation on both roadways and farmlands.

Figure 13:
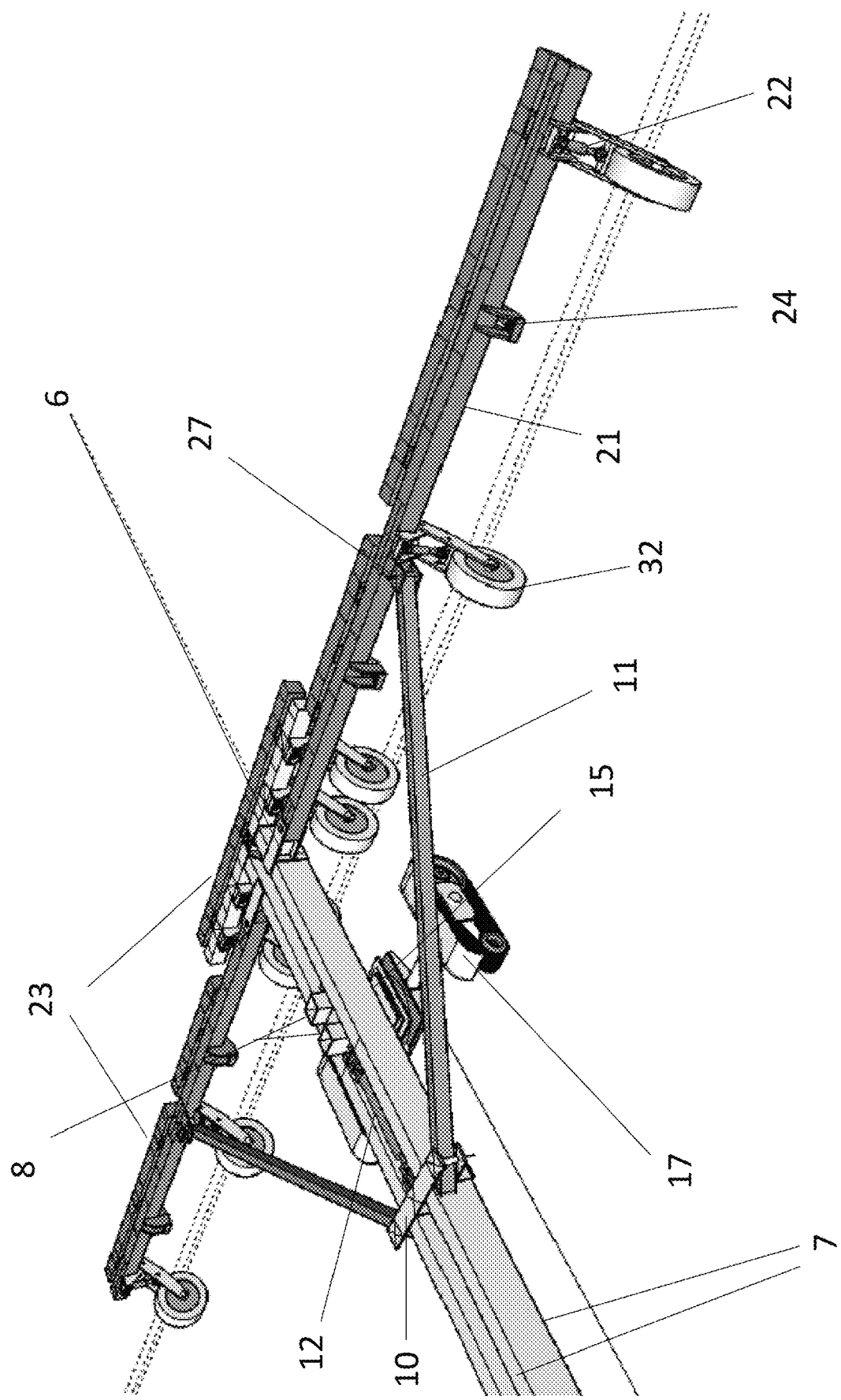
FIG. 13 illustrates a perspective view of the modular agricultural toolbar in an operational configuration and further illustrating the planter implement extension member coupled to the implement member.

In another embodiment of the modular agricultural toolbar, as shown in FIG. 13, the abutting member 25 of the core frame 1 may be configured to couple a planter implement extension member 23, similar in structure and function to the at least one planter implement extension member that may be coupled to the at least one implement attachment member 21.

In some embodiments of the invention, both the plurality of hydraulic cylinders 19 and motor of the rotational gear assembly 15, and the hydraulic piston 12 of the core frame 1 may be configured to interact with a modulator, including but not limited to an onboard computer, a connection module configured to integrate into an already-existing computer control system, or an internal or external global positioning system (GPS) unit or real-time kinematics (RTK) positioning. The modulator is further configured to send commands to the connected hydraulic cylinders 19, motor, and hydraulic piston 12, causing an extension or retraction of either component. This configuration allows for a command terminal to be affixed to either the toolbar itself or the hauling means, enabling the user to extend and retract the at least one implement attachment member 21, raise or lower the rotational gear assembly 15, and rotate the rotational gear assembly 15 in relation to the core frame 1. Raising or lowering the rotational gear assembly 15 further allows for adaptive height during operation of the toolbar, enabling a user to fine tune the performed process to conform with the topography of a given farmland. In some embodiments, raising the rotational gear assembly 15 further enables the plurality of continuous track units 17 to disengage a ground surface while the plurality of wheels 32 are still engaged, along for transportation of the agricultural toolbar without utilizing the continuous track units 17. A person of ordinary skill in the art will understand and appreciate that non-use of the continuous track units 17 during transportation enables generally higher rates of travel during transportation and may preserve a working condition of the plurality of continuous track units 17 for a longer period of time. The rotation of the rotational gear assembly 15 further enables adaptive adjustment of a heading of the toolbar during operation. Extension or retraction of the implement attachment members 21 further enables a user to transition the toolbar between the operational and storage configurations without manual manipulation of the toolbar.

In some embodiments, the interconnected, telescoping segments of the implement attachment member 21 may further comprise a mechanical mechanism coupled to the modulator of the agricultural toolbar, configured to allow mechanical extension or retraction of the implement attachment member 21 along the central axis of the attachment member 21. Such a configuration further allows adjustment of a field coverage by the implement attachment member 21 without manual manipulation by the user. In other embodiments, the agricultural toolbar may comprise a weight capacity of forty-five thousand pounds.

Operation of the modular agricultural toolbar comprises a user first attaching a number of various implements required for a given agricultural process to the implement attachment member 21. A user may also couple a planter implementation extension member to the implement attachment member 21, depending on the desired implements that must be attached. Once the implements are attached, the user then couples the toolbar to a hauling means while the toolbar is in the storage configuration. The user then transports the toolbar to a desired location for cultivation or similar processes and either manually or electronically manipulates the hydraulic rod 12 to move the sled bracket and attached pivotal support members 11 such that the implement attachment member 21 will extend from a position parallel to the core frame 1 to a position perpendicular to the core frame 1. The user then causes the rotational gear assembly 15 to lower until the plurality of continuous track units 17 engages a ground surface. Once engaged, the user may then extend or retract the at least one implement attachment member 21 to a desired length and begin performance of the desired agricultural process.

Once finished, the user then returns the implement attachment member member 21 to a length suitable for transporting the toolbar, raises the rotational gear assembly 15 until the plurality of continuous track units 17 disengages the ground surface, and retracts the implement attachment member 21 by commanding the hydraulic piston 12 to move the sled bracket 10 and pivotal support members 11 until the implement attachment member 21 is parallel with the core frame 1. The user then transports the modular agricultural toolbar to a place of storage and may decouple the toolbar from the hauling means for long term storage of the agricultural toolbar.

Those of ordinary skill in the art will understand and appreciate that the foregoing description of the invention has been made with reference to certain exemplary embodiments of the invention, which describe a modular agricultural toolbar. Those of skill in the art will understand that obvious variations in construction, material, dimensions, or properties may be made without departing from the scope of the invention which is intended to be limited only by the claims appended hereto.

What is claimed is:

1. A modular agricultural toolbar, comprising:
   a. a core frame formed by a plurality of parallel rail members bound at first end by an end plate situated perpendicularly to said rail members and at a second end by an abutting member situated perpendicularly to said rail members, forming a central channel spanning a length of the core frame;
   b. a sled bracket movably coupled to said plurality of rail members to be capable of sliding along the rail members;
   c. at least one implement attachment member coupled at one end to said abutting member and capable of pivoting parallelly to the ground around an attachment point with the abutting member, from being perpendicular to the core frame to being parallel to the core frame and back;
   d. a plurality of attachment points disposed along at least one surface of the implement attachment member and configured to couple agricultural implements;
   e. a plurality of pivotal support members coupled at a first end to the sled basket bracket and coupled at a second end to an at least one implement attachment to support the pivotal movement of the implement attachment member;
   f. a hydraulic piston disposed within the central channel of the core frame and configured to extend and retract along a central axis of the central channel;
   g. a rotational gear assembly coupled to the core frame and configured to rotate about a vertical axis; and
   h. a plurality of continuous track units coupled through a horizontal axle to the rotational gear assembly and configured to engage a ground surface.

2. The modular agricultural toolbar of claim 1, wherein the end plate of the core frame further comprises an attachment point configured to couple a hauling means.

3. The modular agricultural toolbar of claim 2, wherein the abutting member is further configured to couple and retain a planter implement extension member having a plurality of implement attachment points further configured to couple an agricultural implement.

4. The modular agricultural toolbar of claim 1, wherein the core frame further comprises a stationary bracket disposed within and spanning the central channel, the stationary bracket configured to couple an end of the hydraulic piston.

5. The modular agricultural toolbar of claim 3, wherein the stationary bracket is further configured to couple and retain through a vertical axle to the rotational gear assembly.

6. The modular agricultural toolbar of claim 4, wherein the stationary bracket further comprises a plurality of structural units extended away from the core frame and configured to couple an agricultural implement.

7. The modular agricultural toolbar of claim 1, wherein the implement attachment member further comprises interconnected, telescoping segments, configured to allow extension or retraction of a length of the implement attachment member along a central axis of the attachment member.

8. The modular agricultural toolbar of claim 1, wherein the implement attachment member further comprises a plurality of wheels, configured to engage a surface and provide stability to the agricultural toolbar.

9. The modular agricultural toolbar of claim 8, wherein the implement attachment member is further configured to couple and retain a planter implement extension member having a plurality of attachment points configured to couple an agricultural implement.

10. The modular agricultural toolbar of claim 1, wherein the rotational gear assembly further comprises a vertical axle coupled at a first end to the core frame and coupled at a second end to a bearing and motor, the motor configured to mechanically rotate the rotational assembly.

11. The modular agricultural toolbar of claim 10, wherein the rotational gear assembly further comprises an anchoring plate disposed between and coupled to the vertical axle and bearing.

12. The modular agricultural toolbar of claim 11, wherein the anchoring plate is further configured to couple and retain a plurality of hydraulic cylinders, the hydraulic cylinders configured to further moveably couple the core frame.

13. The modular agricultural toolbar of claim 12, wherein the plurality of hydraulic cylinders are connected to a modulator.

\* \* \* \* \*